United States Patent Office 3,796,669
Patented Mar. 12, 1974

3,796,669
PROCESS FOR THE PRODUCTION OF OILY LIQUID-CONTAINING MICROCAPSULES AND THE MICROCAPSULES PRODUCED THEREBY
Masataka Kiritani and Hiroharu Matsukawa, Shizuoka, Japan, assignors to Fuji Photo Film Co., Ltd., Kanagawa, Japan
No Drawing. Filed Apr. 28, 1971, Ser. No. 138,369
Claims priority, application Japan, Apr. 28, 1970, 45/36,545, 45/36,546
Int. Cl. B01j 13/02; B44d 1/02
U.S. Cl. 252—316                                            11 Claims

ABSTRACT OF THE DISCLOSURE

A process for the production of oily liquid-containing microcapsules which comprises mixing a polyvalent polyisocyanate as a first wall-forming material and a second wall-forming material capable of producing a high molecular weight compound by reaction with said polyisocyanate, in said oily liquid, to form a mixture, dispersing or emulsifying said mixture in a polar liquid forming a continuous phase, and reacting said polyvalent isocyanate with said second wall-forming material to thereby form the microcapsule wall from the inside of the oil drop is disclosed. The second wall-forming material is selected from the group consisting of epoxy compounds, acid anhydride compounds, compounds having at least two groups selected from the class consisting of a hydroxyl group, a thiol group, an amino group, and a carboxylic acid group, and prepolymers of said compounds.

BACKGROUND OF THE INVENTION

(1) Field of the invention

The present invention relates to a process for the production of oily liquid-containing microcapsules enclosed with a wall of synthetic high moecular weight material, and more particularly to a process for the production of oily liquid-containing microcapsules by the reaction of a polyvalent isocyanate with a wall-forming material reactive with the polyvalent isocyanate.

DESCRIPTION OF THE PRIOR ART

Microcapsules prepared using isocyanates as the wall-forming material have already been proposed in the prior art; for example, see British Pat. Nos. 1,091,076; 1,091,077 and 1,091,078. However, any of these processes comprises dissolving a polyvalent isocyanate in an oily liquid, dispersing or emulsifying said solution in water, and reacting a polyvalent amine, added to water or an aqeuous layer, with said oily liquid on the surface of the water to form the capsule wall. Said surface polymerization cannot always be carried out efficiently due to the separation of the polyvalent isocyanate and the polyvalent amine reactive to said isocyanate; namely, the polyvalent isocyanate is present in the oily liquid and the polyvalent amine in the aqueous layer, thereby causing the disadvantage that unreacted polyvalent isocyanate remains in the capsule and unreacted polyvalent amine remains in the water, in addition to the fact that it is impossible to obtain microcapsules having high thermal and mechanical strength.

It is therefore an object of the present invention to provide a process for producing oil-containing microcapsules having high thermal and mechanical strength.

Another object of the invention is to provide a process for producing oil-containing microcapsules, by which the thickness of the capsule wall can be easily controlled.

A further object of the invention is to provide a process for effectively producing oil-containing microcapsules which do not contain wall-forming materials.

SUMMARY OF THE INVENTION

The inventors have now found that the above objects are attained by mixing a polyvalent isocyanate as a first wall-forming material and a second wall-forming material reactive with the polyvalent isocyanate in an oily liquid to be microencapsulated, dispersing or emulsifying said mixture in a polar liquid immiscible with said oily liquid, and elevating the temperature to initiate the high molecular weight compound-forming reaction on the surface of the oil drops and to form the oily liquid-containing microcapsules enclosed with the wall of the high molecular weight material.

The inventors have further found that more excellent microcapsules are produced by carrying out the above procedure in the presence of a catalyst which promotes the reaction of polyisocyanate with the second wall-forming material.

DESCRIPTION OF THE PREFERRED EMBODIMENTS

The process of the present invention is characterized in that both polyvalent isocyanate as the first wall-forming material and the second wall-forming material are compatible or mixed with the oily liquid. If the catalyst is used in the reaction for producing the microcapsules, the catalyst is also compatible or mixed with the oily liquid. Therefore, wall-forming materials are residual in neither the microcapsules nor the continuous phase because the process of the reaction proceeds efficiently.

Furthermore, the present invention makes it possible to freely control the thickness of the wall in variation of the wall-forming materials and to easily and markedly increase the thermal and mechanical properties of the obtained microcapsules.

In the practice, the reaction of the isocyanate with the second wall-forming material may be more effectively promoted in the presence of a catalyst.

The incorporation of the wall-forming materials and the catalyst into the oily liquid may also be effected in combination with said oily liquid and a low boiling solvent or a polar solvent.

The purposes of using said low boiling solvent and said polar solvent are based on the following reasons:

(a) All of the wall-forming materials and catalysts can be used without being limited to the solubility of the oily liquid to be incorporated since the first and second wall-forming materials and the catalyst can be completely dissolved thereby.

(b) It is possible to microencapsulate all of the oily liquid to be incorporated without being limited to the solubility of said oily liquid.

(c) By increasing the temperature of the system, the low boiling solvent is released into the polar liquid forming the continuous phase and at that time said wall-forming materials in said oily liquid are transferred to the surface of the oily liquid drops, whereby the microcapsule walls are efficiently formed.

In the present invention, the first wall-forming material, i.e., polyvalent isocyanate, includes polyisothiocyanates other than polyisocyanate. And the second wall-forming material producing a high molecular weight compound by reaction with said isocyanate may be freely selected from compounds having at least two groups active to the isocyanate group, such as a polyvalent hydroxyl compound, and epoxy compound, a polyvalent thiol, a polyvalent amine, an acid anhydride, a polyvalent carboxylic acid and the like. In addition, the wall forming material may also be selected from prepolymers thereof.

Typical embodiments of the polyvalent isoycanate used in the present invention include diisocyanates, such as m-phenylenediisocyanate, p - phenylenediisocyanate, 2,6- trilenediisocyanate, 2,4 - trilenediisocyanate, naphthalene-1,4 - diisocyanate, diphenylmethane - 4,4' - diisocyanate, 3,3' - dimethoxy - 4,4' - biphenyl - diisocyanate, 3,3'-dimethyldiphenylmethane - 4,4' - diisocyanate, xylylene-1,4-diisocyanate, 4,4' - diphenylpropanediisocyanate, trimethylene - diisocyanate, hexamethylenediisocyanate, propylene - 1,2 - diisocyanate, butylene - 1,2 - diisocyanate, cyclohexylene - 1,2 - diisocyanate, cyclohexylene - 1,4 - diisocyanate and the like; diisothiocyanates, such as p-phenylenediisothiocyanate, xylene - 1,4 - diisothiocyanate, ethylidine - diisothiocyanate and the like; triisocyanates, such as 4,4',4" - triphenylmethanetriisocyanate, toluene-2,4,6 - triisocyanate and the like; tetraisocyanates, such as 4,4'-dimethyldiphenyl methane, 2,2',5,5' - tetraisocyanate and the like; isocyanate prepolymers, such as an adduct of trilenediisocyanate with hexanetriol, an adduct of hexamethylene-diisocyanate with hexane triol, an adduct of trilenediisocyanate with hexane triol, an adduct of trilenediisocyanate with trimethylol propane, and the like.

As the polyvalent hydroxyl compound, there are, for example, aliphatic and aromatic polyvalent alcohols, hydroxy polyesters, hydroxy polyalkylene ethers and the like.

The aromatic and aliphatic polyvalent alcohols include, for example, catechol, resorcinol, hydroquinone, 1,2-dihydroxy - 4 - methylbenzene, 1,3 - dihydroxy - 5 - methylbenzene, 3,4 - dihydroxyl - 1 - methylbenzene, 2,4-dihydroxyethylbenzene, 1,3 - naphthalenediol, 1,5 - naphthalenediol, O,O' - biphenol, P,P' - biphenol, 1,1' - bi - 2-naphthol, bisphenol A, 2,2' - bis(4 - hydroxyphenyl) - isopentane, 1,1' - bis(4 - hydroxyphenyl) - cyclopentane, 1,1' - bis(4 - hydroxyphenyl) - cyclohexane, 2,2'-bis(4-hydroxy - 3 - methylphenyl)-propane, bis - (2 - hydroxyphenyl)-methane, xylenediol, ethylene glycol, 1,3-propylene glycol, 1,5 - pentanediol, 1,6 - heptanediol, 1,7 - heptanediol, 1,8 - octanediol, 1,1,1 - trimethylolpropane, hexanetriol, pentaneerythritol, sorbitol and the like; the hydroxy polyesters are obtained from polyvalent carboxylic acids and polyvalent alcohols are condensates of alkyleneoxides with polyvalent alcohols, i.e., hydroxypolyalkylene ethers.

The most useful hydroxypolyalkylene ethers are products derived from an oleophilic alkyleneoxide having 3–6 carbon atoms, for example, condensates of polypropyleneoxide, polybutyleneoxide with glycol, glycerin, pentaerythritol and sorbitol, i.e., polyethers.

Examples of the epoxy compound include aliphatic glycidyl ethers such as diglycidyl ether, glycerin triglycidyl ether and polyalkyl glycidyl ethers; aliphatic glycidyl esters such as the diglycidyl ester of linoleic dimer; diglycidyl ether of bisphenol A, triglycidyl ether of trihydroxyphenolpropane; and glycidyl ether/ester mixtures such as the diglycidyl ether-ester of 4,4-bis(4 - hydroxyphenyl) pentanoic acid.

As the polyvalent thiol, there are, for example, thioglycol, thioglycol condensates and the like.

As the polyamine, there are, for example, aromatic polyamines such as O-phenyleneamine, P-phenyleneamine, 1,5 - S - diamino - naphthalene, phthalamide and the like; and aliphatic copolyamines such as N,N' - S - 1,3 - propylenediamine, N,N' - S - 1,4 - butylenediamine and the like.

It may also be possible to use not only these primary amines but also secondary amines.

Examples of acid anhydrides include maleic anhydride, succinic anhydride, benzoic anhydride and the like.

As the polyvalent carboxylic acid, there are, for example, malonic acid, succinic acid, glutaric acid, adipic acid, pimelic acid, maleic acid, isophthalic acid, terephthalic acid, gluconic acid and the like.

The first wall-forming material may be generally combined with the second wall-forming material on the basis of the heat resistance and the mechanical strength required in the formed wall.

As the oily liquid forming nucleus of the microcapsule, there are, for example, a middle or high boiling natural oil, synthetic oil and solvent, such as, paraffin oil, cotton seed oil, soybean oil, corn oil, olive oil, castor oil, fish oil, lard oil, chlorinated paraffin, chlorinated diphenyl, dibutyl phosphate, tributyl phosphate, tricresyl phosphate, dibutyl maleate, dichlorobenzene, benzyl alcohol and the like.

The low boiling solvent is desirably selected from one having a boiling point lower than that of the polar liquid forming the continuous phase and it is required to be a good solvent for the first wall-forming material and to have good compatibility with the oily liquid. In this case, it may also be allowable to use a polar solvent instead of the foregoing low boiling solvent, and said polar solvent is similarly required to be a good solvent for the first wall-forming material, compatible with the oily liquid and furthermore well-soluble in said polar liquid forming the continuous phase. Said polar solvent may have a boiling point higher than that of said polar liquid.

The low boiling solvent or the polar solvent used in the practice of the process according to the invention is released, on forming the capsule, into the polar liquid forming the continuous phase, whereby little solvent is maintained in said capsule.

Typical examples of the low boiling solvent include n-pentane, methylene chloride, ethylene chloride, carbon disulfide, acetone, methyl acetate, chloroform, methyl acetate, tetrahydrofuran, n-hexane, carbon tetrachloride, ethyl acetate, ethyl alcohol, methyl ethyl ketone, benzene, ethyl ether, petroleum ether and the like.

These may be used singly or in mixture.

The preferred examples of the polar solvent include dioxane, cyclohexanone, methyl isobutyl ketone, dimethylformamide and the like.

Typical examples of the polar liquid forming the continuous phase include not only water but also the other similarly effective compounds, for example, ethylene glycol, glycerin, butyl alcohol, octyl alcohol and the like.

The oily liquid may be effectively emulsified or dispersed (i.e., incorporated) into the polar liquid through the use of a protective colloid or a surfactant.

As the protective colloid there are, for example, natural or synthetic hydrophilic polymers such as gelatin, gum arabic, casein, carboxymethyl cellulose, starch, polyvinyl alcohol and the like. At the surfactant, there are, for example, anionic surfactants such as alkylbenzene sulfonate, alkylnaphthalene sulfonate, polyoxyethylene sulfonate, Turkey red oil and the like; and nonionic surfactants such as polyoxyethylene alkyl ether, sorbitan fatty acid ester and the like.

The catalyst, effected to promote the reaction of the first wall-forming material with the second wall-forming material, includes amines, organometallic compounds, various organic acid salts of metals, tertiary phosphine, alkali metal compounds, radical forming agents and the like.

Said catalyst remarkably influences both the mechanical strength and the heat resistance of the capsule wall formed and the use thereof makes it possible to further improve these properties.

As the amines used as the catalyst in the present invention, there are, for example, trialkylamines, such as triethylene amine; N,N,N',N' - tetramethyl - 1,3 - butanediamine; amino alcohols such as dimethyl ethanolamine; ester amines such as ethoxylamine, ethoxyldiamine, bis-(diethylethanolamine) adipate; triethylenediamine; cyclohexylamine derivatives such as N,N-dimethylcyclohexylamine; morpholine derivative such as N-methyl-morpholine; and piperizine derivatives such as N,N'-diethyl-2-methylpiperizine N,N' - bis - (2 - hydroxypropyl)-2-methylpiperizine, and the like.

As the metal of the organometallic compound, there are, for example, tin, lead, cadmium, cobalt, aluminum, potassium, chromium and zinc. Among them, typical embodiments of organotin compounds are dibutyltin laurate and dibutyltin(2-ethylhexoate) and the like. As the various organic acid salts of metals, there are, for example, organic acid salts of oleic acid, naphthenic acid, caproic acid, octyl acid, and most other organic acids with tin, lead, cadmium, cobalt, aluminum, potassium, chromium and zinc.

Among them, typical embodiments of the organic acid salts of tin are stannous oleate, tin 2-ethylcaproate, tin naphthoate, tin octylate and the like.

Examples of the tertiary phosphine include trialkyl phosphine, dialkylbenzyl phosphine and the like.

Examples of the alkali metal compound include alkali metal hydroxides or fatty acid salts.

And, as the radical-forming agent, there are, for example, benzoyl peroxide, lauroyl peroxide, azobisisobutyronitrile and the like.

These catalysts may be used singly or in combination, and especially, it may be more effective to use amines together with an organometallic compound or an organic acid salt of a metal.

The amounts of the polyisocyanate and the second wall-forming material are decided by the number of isocyanate groups in the polyisocyanate and the number of reactive groups in the second wall-forming material. The number of isocyanate groups to the reactive groups of the second wall-forming material is substantially equivalent, or more.

In case of using a catalyst in the reaction, the amount of the catalyst is 0.1 part by weight or less, based on 1 part by weight of polyisocyanate. But, the weight ratio should not be limited to the above range because, if the process is carried out by using the catalyst in an amount more than 0.1 part, it proceeds more rapidly and effectively.

The reaction of the two wall-forming materials may be conducted at a temperature higher than 50° C., preferably 60° C.–80° C.

The process of the present invention is characteristic in the mixture form dissolving the first wall-forming material, the polyvalent isocyanate, the second wall-forming material and the catalyst in the oily liquid to be incorporated and makes, therefore, the promotion of the high molecular weight compound-forming reaction efficient without maintenance of the unreacted wall-forming material in the capsule thereby successfully preparing the objective capsule with extremely high heat resistance and mechanical properties.

Consequently, according to the process of the present invention, an oily liquid containing a solvent, a perfume, a dye or an adhesive can be microencapsulated, and even if an oil-insoluble liquid or solid is used as the core material, it can be easily microencapsulated by dispersing it in the oily liquid.

Furthermore, the microcapsule according to the present invention is especially useful in pressure-sensitive copying paper.

The following specific examples are intended to show the nature of the invention without limiting it to the examples themselves.

EXAMPLE 1

5 g. of trilenediisocyanate as the wall-forming material and 3 g. of polyoxypropylenehexanol of sorbitol base were mixed with 20 g. of chlorinated diphenyl. To the mixture was added 0.3 g. of lead octylate as the catalyst. Thereafter, said oily liquid was gradually poured into a solution of 5 g. of gum arabic dissolved in 20 g. of water at 20° C. with vigorous stirring to form an oil-in-water type emulsion. 100 g. of water (40° C.) was then added to the emulsion, with continuing of the stirring, and the temperature was gradually elevated to 90° C. The system was maintained at that temperature for 20 minutes to complete the capsulation, and as a result, a chlorinated diphenyl-containing microcapsule was obtained.

Said microcapsule-containing solution was dried by a spray-drying method, and the powdered microcapsules were allowed to stand for 5 days in a drying box kept at 110° C. The capsules exhibited an extremely high heat resistance since no volatilization of the chlorinated diphenyl was observed.

On the other hand, the heat resistance of the microcapsules obtained according to the processes of British Pat. Nos. 1,091,076; 1,091,077 and 1,091,078 were low and almost all of the chlorinated diphenyl incorporated into the capsule was volatilized on being stored for 5 hours at a temperature of 110° C.

EXAMPLE 2

7 g. of xylylene diisocyanate and 3 g. of O,O-biphenol were dissolved in 30 g. of oily liquid (chlorinated paraffin) together with 10 g. of low boiling tetrahydrofuran.

After adding thereto 0.02 g. of N-methylmorpholine as a catalyst, at a temperature below 20° C., said oily solvent was emulsified in an aqueous solution of gum arabic by the same manner as in Example 1 and thereafter similarly heated. As the result, a chlorinated paraffin-containing microcapsule was given.

EXAMPLE 3

5 g. of a diphenylmethanediisocyanate type polyvalent isocyanate of the general formula

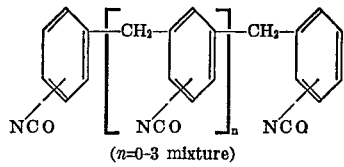

(n=0-3 mixture)

6 g. of a polyoxypropylene ether of glycerin base having a trifunctional group and 20 g. of a low boiling solvent, methylene chloride, were mixed with 20 g. of dioctyl phthalate. To the mixture was added 0.5 g. of dibutyl tin laurate as a catalyst at a temperature below 15° C. Thereafter, said oily liquid was gradually poured into a solution of 4 g. of gum arabic and 0.5 g. of Turkey oil dissolved in 20 g. of water (15° C.), with vigorous stirring to form an oil-in-water type emulsion. After the emulsifying was over, 100 g. of water (60° C.) was poured into the emulsion while continuing the stirring and the temperature was elevated to 95° C. The system was maintained at that temperature for 60 minutes to complete the capsulation and as a result, a dioctyl phthalate-containing microcapsule was obtained.

EXAMPLE 4

4 g. of a hydroxy polyester having an OH value of 300, Desmophen 800 (trade name, Bayer Corp., a polyester consisting of adipic acid, phthalic anhydride and trimethylolpropane) and 4 g. of an adduct of trilenediisocyanate with trimethylolpropane, Desmodur L (trade name, Bayer Corp.) were mixed with 20 g. of chlorinated diphenyl containing 0.2 g. of sodium octylate. Thereafter, said mixture was treated in the same manner as in Example 3 and as a result, a chlorinated diphenyl-containing microcapsule was given.

EXAMPLE 5

6 g. of diphenylmethane-4,4'-diisocyanate and 4 g. of polysulfide resin, Thiokol LP–2 (trade name, produced by Thikol Corp.) as the polythiol were mixed with 30 g. of olive oil together with 0.5 g. of dioctyltin laurate as a catalyst. Thereafter, said mixture was treated in the same manner as in Example 3, and as a result, an olive-oil-containing microcapsule was given.

EXAMPLE 6

6 g. of xylylene-1,4-diisocyanate and 5 g. of phthalic anhydride were dissolved in 15 g. of a mixed solvent of methylene chloride and acetone (2:1), and 20 g. of chlorinated diphenyl was added thereto. Then, after adding 0.3 g. of lead naphthenate thereto, the resultant mixture was treated in the same manner as in Example 3 and as a result, a chlorinated diphenyl-containing microcapsule was given.

EXAMPLE 7

5 g. of trilenediisocyanate and 3 g. of Epikote 864 (trade name, glycidyl polyether having an epoxy equivalent of 305, produced by Shell Chemical Corp.), were mixed with 30 g. of fluid paraffin together with 10 g. of acetone.

After adding 0.5 g. of cadmium octylate as a catalyst thereto, the resultant mixture was treated in the same manner as in Example 3 and as a result, a fluid paraffin-containing microcapsule was given.

What is claimed is:

1. A process for the production of oily liquid-containing microcapsules which comprises mixing a polyvalent polyisocyanate as a first wall-forming material and a second wall-forming material selected from the group consisting of epoxy compounds, acid anhydride compounds, compounds having at least two groups selected from the class consisting of a hydroxyl group, a thiol group, an amino group, and a carboxylic acid group, and prepolymers of said compounds, capable of producing a high molecular weight compound by reaction with said polyisocyanate, in said only liquid, to form a mixture, dispensing or emulsifying said mixture in a polar liquid forming a continuous phase, and reacting said polyvalent isocyanate with said second wall-forming material to thereby form the microcapsule wall from the inside of the oil drop.

2. The process as claimed in claim 1, wherein said second wall-forming material is a polyvalent hydroxyl compound, an epoxy compound, a polyvalent thiol, a polyvalent amine, an acid anhydride or a polyvalent carboxylic acid.

3. A process for the production of oily liquid-containing microcapsules which comprises mixing polyisocyanate as a first wall-forming material, a second wall-forming material selected from the group consisting of epoxy compounds, acid anhydride compounds, compounds having at least two groups selected from the class consisting of a hydroxyl group, a thiol group, an amino group, and a carboxylic acid group, and prepolymers of said compounds, capable of producing a high molecular weight compound by reaction with said polyisocyanate, and a catalyst capable of promoting the reaction of the first wall-forming material with the second wall-forming material in an oily liquid to form a mixture, dispersing or emulsifying said mixture in a polar liquid forming a continuous phase, and reacting said isocyanate with the second wall-forming material to form the microcapsule wall from the inside of the oil drop.

4. The process as claimed in claim 3, wherein said second wall-forming material is a polyvalent hydroxyl compound, an epoxy compound, a polyvalent thiol, a polyvalent amine, an acid anhydride or a polyvalent carboxylic acid.

5. The process as claimed in claim 3, wherein said catalyst is an amine compound, an organic compound, a metal salt of an organic acid, a tertiary phosphine, an alkali metal compound or a radical-forming agent.

6. The process as claimed in claim 1, wherein said polar liquid is water, ethylene glycol, glycerin, butyl alcohol or octyl alcohol.

7. The process as claimed in claim 1, wherein the amounts of said first and second wall-forming materials are such that the number of isocyanate groups in the first wall-forming material is at least substantially equivalent to the number of groups in the second wall-forming material reactive with isocyanate groups.

8. The process as claimed in claim 3, wherein the amount of catalyst is not more than 0.1 part by weight, based on 1 part by weight of polyisocyanate.

9. The process as claimed in claim 1, wherein the reaction is conducted at a temperature of greater than 50° C.

10. The oily liquid-containing microcapsules produced by the process of claim 1.

11. The oily liquid-containing microcapsules produced by the process of claim 3.

References Cited
UNITED STATES PATENTS 2,969,330   1/1961   Brynko _____ 252—316

FOREIGN PATENTS 1,091,076   11/1967   Great Britain _____ 252—316

RICHARD D. LOVERING, Primary Examiner

U.S. Cl. X.R.

117—100 A; 252—314, 364, 4